United States Patent
Iwamoto et al.

(10) Patent No.: US 8,153,298 B2
(45) Date of Patent: Apr. 10, 2012

(54) POSITIVE ELECTRODE FOR ALKALINE BATTERY AND ALKALINE BATTERY USING THE SAME

(75) Inventors: Shinichi Iwamoto, Osaka (JP); Yoshihisa Hirose, Osaka (JP)

(73) Assignee: Hitachi Maxell Energy, Ltd., Otokuni-Gun, Kyoto (JP)

( * ) Notice: Subject to any disclaimer, the term of this patent is extended or adjusted under 35 U.S.C. 154(b) by 916 days.

(21) Appl. No.: 12/188,036

(22) Filed: Aug. 7, 2008

(65) Prior Publication Data

US 2009/0047578 A1 Feb. 19, 2009

(30) Foreign Application Priority Data

Aug. 10, 2007 (JP) ................. 2007-209316

(51) Int. Cl.
*H01M 4/50* (2010.01)
*H01M 4/62* (2006.01)
(52) U.S. Cl. ...................... 429/224; 429/220
(58) Field of Classification Search .................. 429/220, 429/224

See application file for complete search history.

(56) References Cited

U.S. PATENT DOCUMENTS

| | | | | |
|---|---|---|---|---|
| 4,312,930 A * | 1/1982 | Hunter | | 429/224 |
| 4,507,371 A * | 3/1985 | Thackeray et al. | | 429/224 |
| 4,604,336 A * | 8/1986 | Nardi | | 429/224 |
| 4,904,552 A * | 2/1990 | Furukawa et al. | | 429/224 |
| 6,783,893 B2 * | 8/2004 | Bowden et al. | | 429/224 |
| 7,045,252 B2 * | 5/2006 | Christian et al. | | 429/224 |
| 2004/0248007 A1 | 12/2004 | Tamakoshi et al. | | |
| 2005/0019658 A1 | 1/2005 | Noya et al. | | |
| 2006/0183019 A1 * | 8/2006 | Davidson et al. | | 429/142 |
| 2007/0015054 A1 | 1/2007 | Nunome et al. | | |
| 2008/0090138 A1 * | 4/2008 | Vu et al. | | 429/220 |

FOREIGN PATENT DOCUMENTS

| | | |
|---|---|---|
| JP | 2001-307746 A | 11/2001 |
| JP | 2007-26896 A | 2/2007 |
| JP | 2007-48737 A | 2/2007 |
| JP | 2007-123149 A | 5/2007 |
| WO | WO-03/044879 A3 | 5/2003 |
| WO | WO-2004/015794 A1 | 2/2004 |

\* cited by examiner

*Primary Examiner* — Helene Klemanski
(74) *Attorney, Agent, or Firm* — Birch, Stewart, Kolasch & Birch, LLP (57) ABSTRACT

A positive electrode for an alkaline battery of the present invention includes a spinel-type manganese oxide as a positive electrode active material, wherein the spinel-type manganese oxide has a potential of 0.26 to 0.34 V with respect to a Hg/HgO reference electrode, and the content of the spinel-type manganese oxide in the entire positive electrode active material is not less than 30 mass %. Further, an alkaline battery of the present invention includes the above-described positive electrode for an alkaline battery of the invention, a negative electrode and an electrolyte.

18 Claims, 3 Drawing Sheets

POSITIVE ELECTRODE FOR ALKALINE BATTERY AND ALKALINE BATTERY USING THE SAME

BACKGROUND OF THE INVENTION

1. Field of the Invention

The present invention relates to a positive electrode for an alkaline battery that can constitute an alkaline battery having a high capacity and exhibiting excellent load characteristics, and an alkaline battery using the positive electrode for an alkaline battery.

2. Description of Related Art

Alkaline batteries using manganese dioxide as a positive electrode active material have been recently used for an increasing number of applications that require charging at a comparatively large electric current value, such as the power source for digital cameras, and there has been a need to improve the load characteristics of alkaline batteries.

Under such circumstances, a technique for improving the load characteristics of alkaline batteries by using spinel-type manganese dioxide (lambda-type manganese dioxide) as a positive electrode active material is proposed, for example, in JP 2007-048737 A and JP 2007-123149 A.

Although alkaline batteries using spinel-type manganese dioxide as a positive electrode active material exhibit improved load characteristics, they suffer from a very low discharge capacity. For this reason, in JP 2007-048737 A and JP 2007-123149 A above, electrolytic manganese dioxide (gamma-type manganese dioxide), which is used in conventional alkaline batteries, is used in combination with spinel-type manganese dioxide, thereby avoiding a decrease in the discharge capacity.

However, the amount of spinel-type manganese dioxide in the positive electrode active material needs to be set very small in order to secure a practically useful discharge capacity by a method using electrolytic manganese dioxide in combination with spinel-type manganese dioxide, and therefore, there is a limit in ensuring the effect provided by use of spinel-type manganese dioxide.

SUMMARY OF THE INVENTION

The present invention was achieved in view of the above-described circumstances, and it is an object of the invention to provide an alkaline battery having a high capacity and exhibiting excellent load characteristics, and a positive electrode for an alkaline battery that can constitute such an alkaline battery.

A positive electrode for an alkaline battery according to the present invention includes a spinel-type manganese oxide as a positive electrode active material, wherein the spinel-type manganese oxide has a potential of 0.26 to 0.34 V with respect to a Hg/HgO reference electrode, and the content of the spinel-type manganese oxide in the entire positive electrode active material is not less than 30 mass %.

Further, an alkaline battery according to the present invention includes: a positive electrode; a negative electrode; and an electrolyte, wherein the positive electrode includes a spinel-type manganese oxide having a potential of 0.26 to 0.34 V with respect to a Hg/HgO reference electrode as a positive electrode active material, and the content of the spinel-type manganese oxide in the entire positive electrode active material of the positive electrode is not less than 30 mass %.

With the present invention, it is possible to provide an alkaline battery having a high capacity and exhibiting excellent load characteristics, and a positive electrode for an alkaline battery that can constitute such an alkaline battery.

DETAILED DESCRIPTION OF THE INVENTION

Hereinafter, the present invention will be described by way of illustrative embodiments with reference to the drawings.

Embodiment 1

First, a positive electrode for an alkaline battery according to the present invention shall be described. The positive electrode for an alkaline battery of the present invention uses a spinel-type manganese oxide having a potential of not less than 0.26 V and not more than 0.34 V with respect to a Hg/HgO reference electrode (hereinafter, occasionally referred to as "low-potential spinel-type manganese oxide") as a positive electrode active material.

Spinel-type manganese dioxide that is being investigated for use in alkaline batteries has a potential that is approximately more than 0.34 V and approximately not more than 0.44 V with respect to a Hg/HgO reference electrode. In the case of using such spinel-type manganese dioxide as a positive electrode active material, the load characteristics of alkaline batteries can be improved, but the discharge capacity will be very low. For this reason, conventional alkaline batteries using spinel-type manganese dioxide as a positive electrode active material use electrolytic manganese dioxide (gamma-type manganese dioxide) in combination. Moreover, the ratio of spinel-type manganese dioxide is reduced, thereby securing the discharge capacity.

Further, alkaline batteries using only ordinary spinel-type manganese dioxide as a positive electrode active material have a high battery voltage of more than 1.7 V. Many alkaline batteries that are currently in wide use (alkaline batteries using manganese dioxide as a positive electrode active material) have a battery voltage of about 1.6 V, and the devices for which these alkaline batteries are used are also designed based on such a voltage. Therefore, when alkaline batteries using only ordinary spinel-type manganese dioxide as a positive electrode active material are used as alternative batteries for alkaline batteries that are currently in wide use, a heavy load is imposed on the electronic circuits or the circuit components inside the devices, thereby possibly causing heat generation or a reduction of the service life of the devices. In the case of devices including a filament lamp, such as a flashlight, an increase in the battery voltage may lead to a greater amount of heat generation, which may reduce the service life of the filament. Also for these reasons, conventional alkaline batteries using spinel-type manganese dioxide as a positive electrode active material use electrolytic manganese dioxide (gamma-type manganese dioxide) in combination. Moreover, the ratio of spinel-type manganese dioxide is reduced to make an adjustment for preventing an excessive increase in the battery voltage.

Furthermore, since the crystal structure of ordinary spinel-type manganese dioxide has low stability in an electrolyte (alkaline electrolyte) used for alkaline batteries, conventional alkaline batteries using spinel-type manganese dioxide as a positive electrode active material also have the problem of deteriorated battery characteristics (for example, load characteristics) after storage.

In contrast, when a low-potential spinel-type manganese oxide according to the present invention is used as a positive electrode active material, it is possible to improve the load characteristics of alkaline batteries, and also to increase the discharge capacity. Accordingly, when a low-potential spinel-type manganese oxide of the present invention is used as a positive electrode active material, the low-potential spinel-type manganese oxide can constitute 30 mass % or more of the entire positive electrode active material, so that the effect provided by the use of the spinel-type manganese oxide (load characteristics improving effect) can be well secured.

Moreover, the battery voltage of an alkaline battery using the low-potential spinel-type manganese oxide of the present invention as a positive electrode active material also can be suppressed, for example, at 1.7 V or less. Accordingly, an alkaline battery formed by using the low-potential spinel-type manganese oxide of the present invention as a positive electrode active material can replace alkaline batteries that are currently in wide use (alkaline batteries using manganese dioxide as a positive electrode active material), even if the low-potential spinel-type manganese oxide constitutes 30 mass % or more of the entire positive electrode active material.

Furthermore, the low-potential spinel-type manganese oxide of the present invention has good stability in an alkaline electrolyte, and therefore, an alkaline battery of the present invention, which uses such a low-potential spinel-type manganese oxide as a positive electrode active material, also can suppress a deterioration of the battery characteristics caused by storage.

As described above, the potential of the low-potential spinel-type manganese oxide according to the present invention with respect to a Hg/HgO reference electrode is adjusted to be not less than 0.26 V and not more than 0.34 V. A spinel-type manganese oxide having such a potential has a crystal structure that is slightly changed from that of ordinary spinel-type manganese dioxide, and this seems to be the reason why it exhibits a low potential, and has an improved stability in an alkaline electrolyte.

In other words, a spinel-type manganese oxide having an excessively high potential with respect to a Hg/HgO reference electrode cannot sufficiently ensure the effect of improving the load characteristics of alkaline batteries, and increasing the discharge capacity at the same time. In addition, a spinel-type manganese oxide having an excessively low potential with respect to a Hg/HgO reference electrode cannot improve the load characteristics of alkaline batteries sufficiently. The potential of the low-potential spinel-type manganese oxide with respect to a Hg/HgO reference electrode is preferably not less than 0.27 V, more preferably not less than 0.28 V, and preferably not more than 0.32 V.

Here, the "potential of the spinel-type manganese oxide with respect to a Hg/HgO reference electrode" as used herein refers to a value measured as follows. That is, first, 100 parts by mass of a spinel-type manganese oxide, 10 parts by mass of a 2 mass % carboxymethyl cellulose (CMC) solution, 20 parts by mass of water and 1 part by mass of a 60 mass % polytetrafluoroethylene (PTFE) dispersion are mixed to prepare a paste. After this paste is filled into three-dimensional nickel foam, nickel wire is spot-welded to the foam. Then, the three-dimensional nickel foam is immersed in a 32 mass % KOH aqueous solution (alkaline electrolyte) containing 2.18 mass % of ZnO, and the potential of the spinel-type manganese oxide in the three-dimensional nickel foam is measured at room temperature, using Hg/HgO as a reference electrode.

Examples of the low-potential spinel-type manganese oxide according to the present invention include: (1) a spinel-type manganese oxide in which Mn is partly substituted with Cu; and (2) a spinel-type manganese oxide obtained by heat-treating a spinel-type manganese oxide having a potential of more than 0.34 V with respect to a Hg/HgO reference electrode (i.e., ordinary spinel-type manganese dioxide) at 180 to 220° C. for 15 to 25 hours.

Ordinary spinel-type manganese dioxide can be produced, for example, by firing a mixture of electrolytic manganese dioxide (gamma-type manganese dioxide) and a Li compound (e.g., lithium carbonate or lithium hydroxide) at 950 to 1100° C. for 15 to 30 hours to synthesize lithium-manganese spinel, and extracting Li from the lithium-manganese spinel by treating the lithium-manganese spinel with acid such as sulfuric acid, nitric acid or hydrochloric acid. A low-potential spinel-type manganese oxide described in (1) can be produced by additionally mixing a Cu compound (e.g., copper oxide or copper hydroxide) with a mixture of the electrolytic manganese dioxide and the Li compound in the above-described lithium-manganese spinel synthesizing step, firing the whole under the same conditions as described above to form lithium-manganese spinel in which Mn is partly substituted with Cu, and extracting Li from the lithium-manganese spinel under the same conditions as described above.

A low-potential spinel-type manganese oxide described in (1) can be approximately represented by the general formula: $Mn_{1-x}Cu_xO_2$ (wherein $0.01 \leq x \leq 0.2$). That is, in the low-potential spinel-type manganese oxide described in (1), the amount of Cu is preferably 1 to 20 mol %, based on a total of 100 mol % of Mn and Cu (a total of 100 mol % of Mn, Cu and Li, in the case where Li is contained as described later). When the amount of Cu is too small, there is the possibility that the potential of the spinel-type manganese oxide with respect to a Hg/HgO reference electrode may be too high. On the other hand, when the amount of Cu is too large, there is the possibility that the potential of the spinel-type manganese oxide with respect to a Hg/HgO reference electrode may be too low. The amount of Cu in the low-potential spinel-type manganese oxide described in (1) can be adjusted by regulating the composition ratio of the electrolytic manganese dioxide, the Li compound and the Cu compound, in the case where the above-described synthesizing method is used.

The low-potential spinel-type manganese oxide described in (2) can be produced, for example, by heat-treating ordinary spinel-type manganese dioxide synthesized by the above-described method (a spinel-type manganese oxide having a potential of more than 0.34 V with respect to a Hg/HgO reference electrode) using, for example, an electric furnace (e.g., "Type 1400 Furnaces" manufacture by Barnstead International) at 180 to 220° C. for 15 to 25 hours. When the heat-treatment period is too short, or the heat-treating temperature is too low, there is the possibility that the potential of the spinel-type manganese oxide with respect to a Hg/HgO reference electrode may be too high. On the other hand, when the heat treatment period is too long, or the heat-treating temperature is too high, the potential of the spinel-type manganese oxide with respect to a Hg/HgO reference electrode may be too low.

The low-potential spinel-type manganese oxide described in (2) can be approximately represented by the general formula: $MnO_2$.

For each of the low-potential spinel-type manganese oxide described in (1) and the low-potential spinel-type manganese oxide described in (2), it is preferable to extract as much Li as possible from the lithium-manganese spinel (in the case of (1), lithium-manganese spinel also containing Cu) serving as its precursor during the extraction of Li, from the viewpoint of increasing the theoretical discharge capacity. However, complete extraction of Li is comparatively difficult, and therefore, a certain amount of Li may remain. In other words, each of the low-potential spinel-type manganese oxide described in (1) and the low-potential spinel-type manganese oxide described in (2) may contain a certain amount of Li.

More specifically, in the case of the low-potential spinel-type manganese oxide described in (1), the amount of Li is preferably not more than 10 mol %, based on a total of 100 mol % of Mn, Cu and Li. In the case of the low-potential spinel-type manganese oxide described in (2), the amount of Li is preferably not more than 10 mol %, based on a total of 100 mol % of Mn and Li.

From the viewpoint of increasing the theoretical discharge capacity, it is particularly preferable that each of the low-potential spinel-type manganese oxide described in (1) and the low-potential spinel-type manganese oxide described in (2) does not contain Li. However, considering the efficiency in the step of extracting Li from the lithium-manganese spinel, it is realistic to set the lower limit of the Li amount to about 0.1 mol %, based on a total of 100 mol % of Mn, Cu and Li in the case of the low-potential spinel-type manganese oxide described in (1), and to set the lower limit of the Li amount to about 0.11 mol %, based on a total of 100 mol % of Mn and Li in the case of the low-potential spinel-type manganese oxide described in (2).

In the low-potential spinel-type manganese oxide described in (1) and low-potential spinel-type manganese oxide described in (2) above, being "spinel-type" means that when the X-ray diffraction data of each of the manganese oxides is analyzed by the Rietveld method, assuming that the crystal structure of the manganese oxide belongs to the space group Fd3m (No. 227), which is a spinel-type crystal structure, the S value (an index of the analytical error) is less than 2.

In a positive electrode used for an alkaline battery according to the present invention, the content of the low-potential spinel-type manganese oxide in the entire positive electrode active material (the blending quantity in the entire positive electrode active material) is not less than 30 mass %, preferably not less than 60 mass %. With the present invention, even if the low-potential spinel-type manganese oxide in the positive electrode has such a high content, it is possible to form an alkaline battery having a high capacity and about the same level of voltage as that of conventional alkaline batteries using gamma-type manganese dioxide as a positive electrode active material. Alternatively, in the positive electrode used for an alkaline battery according to the present invention, the amount of the low-potential spinel-type manganese oxide in the entire positive electrode active material may be 100 mass %.

In the case where a positive electrode active material other than the low-potential spinel-type manganese oxide is used in the positive electrode for an alkaline battery according to the present invention, it is preferable to use electrolytic manganese dioxide, for example. The content of the electrolytic manganese dioxide in the entire positive electrode active material (the blending quantity in the entire positive electrode active material) is preferably not more than 70 mass %, more preferably not more than 40 mass %.

As the positive electrode for an alkaline battery according to the present invention, it is possible to use a positive electrode obtained by adding a conductive aid, an electrolyte, a binder and the like to a positive electrode active material made of the above-described low-potential spinel-type manganese oxide or of a mixture of the low-potential spinel-type manganese oxide and another active material (e.g., electrolytic manganese dioxide) to form a positive electrode mixture, filling the positive electrode mixture into a mold, the exterior can of a battery or the like, and molding it into the form of a ring (hollow cylinder).

As the conductive aid, it is possible to use, for example, graphite, ketjen black, acetylene black, or the like. Preferably, the amount of the conductive aid in the positive electrode mixture is 5 to 20 mass %, for example.

As the binder, it is possible to use, for example, PTFE, polyvinylidene fluoride, styrene butadiene rubber, or the like. Preferably, the amount of the binder in the positive electrode mixture is 0.2 to 20 mass %, for example.

As the electrolyte, it is possible to use, for example, an aqueous alkaline solution in which a hydroxide of alkali metal, such as potassium hydroxide, sodium hydroxide or lithium hydroxide, is dissolved in water, an aqueous alkaline solution obtained by adding zinc oxide or the like to the aforementioned solution, or the like. For example, the concentration of the hydroxide of alkali metal in the electrolyte is preferably 40 to 60 mass % for potassium hydroxide. In the case of using zinc oxide, the concentration of zinc oxide is preferably 1.0 to 4.0 mass %.

Embodiment 2

Next, an alkaline battery according to the present invention shall be described. It is sufficient that the alkaline battery of the present invention includes the positive electrode for an alkaline battery according to the present invention described in Embodiment 1. There is no particular limitation with respect to other configurations and structures, and those used in conventional alkaline batteries may be used.

As a negative electrode used for the alkaline battery of the present invention, a gel negative electrode mixture including particles of zinc or a zinc alloy (hereinafter, both are collectively referred to as "zinc-based particles"), an electrolyte and a gelling agent may be used, for example.

From the viewpoint of improving the load characteristics of the alkaline battery, the ratio of the particles having a particle diameter of 10 to 75 μm in the zinc-based particles is preferably not less than 20 mass %, more preferably not less than 30 mass %.

In general, the zinc-based particles are produced by gas atomization. Although the particle diameter and the particle size distribution of the zinc-based particles can be measured using, for example, a laser scattering particle size distribution measurement apparatus, they also can be determined more conveniently based on the ratio of those particles that pass through a sieve having a particular mesh size. For example, by classifying the zinc-based particles used for the negative electrode using a sieve of 200 mesh, it is possible to determine the ratio of the zinc-based particles having a particle diameter of not more than 75 μm. Among these particles, the ratio of the zinc-based particles having a particle diameter of less than 10 μm is difficult to determine by classification using a sieve, and therefore measurement using the above-described particle size distribution measurement apparatus is used in combination to determine the ratio of the particles having a particle diameter of less than 10 μm. By subtracting the obtained ratio from the ratio of the zinc-based particles having a particle diameter of not more than 75 μm, the ratio of the zinc-based particles having a particle diameter of 10 to 75 μm can be determined. It is also possible to use a method in which the zinc-based particles that have passed through a sieve of 200 mesh are further classified using a sieve of finer mesh to remove the particles having a particle diameter of less than 10 μm, and the remaining particles are used for producing a negative electrode.

However, an alkaline battery using zinc-based powder for the negative electrode has the problem of hydrogen gas generation resulting from a reaction of zinc and the electrolyte. Therefore, it is preferable that this reaction is suppressed to a minimum at the negative electrode. From the viewpoint of suppressing the above-described hydrogen gas generation at the negative electrode and improving the battery productivity by maintaining good flowability of the negative electrode mixture, the ratio of the particles having a particle diameter of 10 to 75 μm in the zinc-based particles is set to be preferably not more than 70 mass %, more preferably not more than 50 mass %. In addition, zinc-based particles having a particle diameter of less than 10 μm increase gas generation and thus adversely affect the storage characteristics of the battery, and the oxide formed on the surface of these particles impedes electrical contact, thereby preventing the particles from contributing to the discharge reaction. Therefore, it is desirable that the amount of such minute particles is reduced to a minimum. Considering the balance between the load characteristics and the storage characteristics, the appropriate average particle diameter of the zinc-based particles as a whole (the weight average particle diameter measured by the above-described method using a sieve) used for the alkaline battery of the present invention is 80 to 200 μm.

In order to prevent the above-described hydrogen gas generation reaction from zinc, it is effective to use, as the zinc-based particles, zinc alloy particles containing at least one element such as indium, bismuth and aluminum. It is particularly preferable to use zinc alloy particles containing at least indium and bismuth. The content of these elements in the zinc alloy of the zinc alloy particles should be not less than 0.01 mass % for indium, not less than 0.003 mass % for bismuth, and not less than 0.0001 mass % for aluminum. Preferably, the content of indium is 0.03 to 0.07 mass %, the content of bismuth is 0.007 to 0.07 mass %, and the content of aluminum is 0.001 to 0.007 mass %. In the case of a zinc alloy containing these elements, the remainder is composed of, for example, zinc and unavoidable impurities.

Similarly to the electrolyte used for the positive electrode, as the electrolyte used for the negative electrode, it is possible to use, for example, an aqueous alkaline solution in which a hydroxide of alkali metal, such as potassium hydroxide, sodium hydroxide or lithium hydroxide, is dissolved in water, an aqueous alkaline solution obtained by adding zinc oxide or the like to the aforementioned solution, or the like. For example, the concentration of the hydroxide of alkali metal in the electrolyte is preferably 28 to 38 mass % for potassium hydroxide. In the case of using zinc oxide, the concentration of zinc oxide is preferably 1.0 to 4.0 mass %.

Examples of the gelling agent used for the negative electrode include polyacrylic acids (e.g., polyacrylic acid, sodium polyacrylate and ammonium polyacrylate) and celluloses (e.g., CMC, methyl cellulose, hydroxy propyl cellulose, and their alkali salts). Further, as disclosed in JP 2001-307746 A, it is also preferable to use a water-absorbing polymer of a cross-linked polyacrylic acid or its salt (e.g., sodium polyacrylate or ammonium polyacrylate) and a gelling agent other than these in combination. Examples of the gelling agent used in combination with a water-absorbing polymer of a cross-linked polyacrylic acid or its salt include the above-mentioned celluloses, and a cross-linked and branched polyacrylic acid or its salts (e.g., sodium salt and ammonium salt). In addition, it is preferable that the above-mentioned water-absorbing polymer of a cross-linked polyacrylic acid or its salt has an average particle diameter of 10 to 100 μm, and has a spherical shape.

The content of the zinc-based particles in the negative electrode mixture is preferably 50 to 75 mass %, for example. The content of the electrolyte in the negative electrode mixture is preferably 25 to 50 mass %, for example. Further, the content of the gelling agent in the negative electrode mixture is preferably 0.01 to 1.0 mass %, for example.

In addition, a small amount of an indium compound such as indium oxide, a bismuth compound such as bismuth oxide, or the like may be contained in the negative electrode mixture. By including these compounds, it is possible to prevent generation of a gas resulting from a corrosive reaction between the zinc-based particles and the electrolyte more effectively. However, including these compounds in an excessively large amount may reduce the load characteristics of the battery. Therefore, it is preferable that the contents of these compounds are appropriately decided within a range that will not cause such a problem. For example, it is recommended that the contents of the indium compound and the bismuth compound are both set to be about 0.003 to 0.05 parts by mass, per 100 parts by mass of the zinc-based particles.

Besides the electrolyte used for the positive electrode and the negative electrode, as an electrolyte (alkaline electrolyte) injected into the battery, it is possible to use, for example, an aqueous alkaline solution made of an aqueous solution of a hydroxide of alkali metal, such as potassium hydroxide, sodium hydroxide or lithium hydroxide, or an aqueous alkaline solution to which zinc oxide is added, as with the electrolyte used for the positive electrode and the negative electrode. The concentration of the hydroxide of alkali metal in the electrolyte is preferably 28 to 38 mass %, for example, in the case of potassium hydroxide. In the case of using zinc oxide, the concentration of zinc oxide is preferably 1.0 to 4.0 mass %.

As the separator, it is possible to use, for example, nonwoven fabric composed mainly of vinylon and rayon, vinylon-rayon nonwoven fabric, polyamide nonwoven fabric, polyolefin-rayon nonwoven fabric, vinylon paper, vinylon-linter pulp paper and vinylon-mercerized pulp paper.

Figure 1:
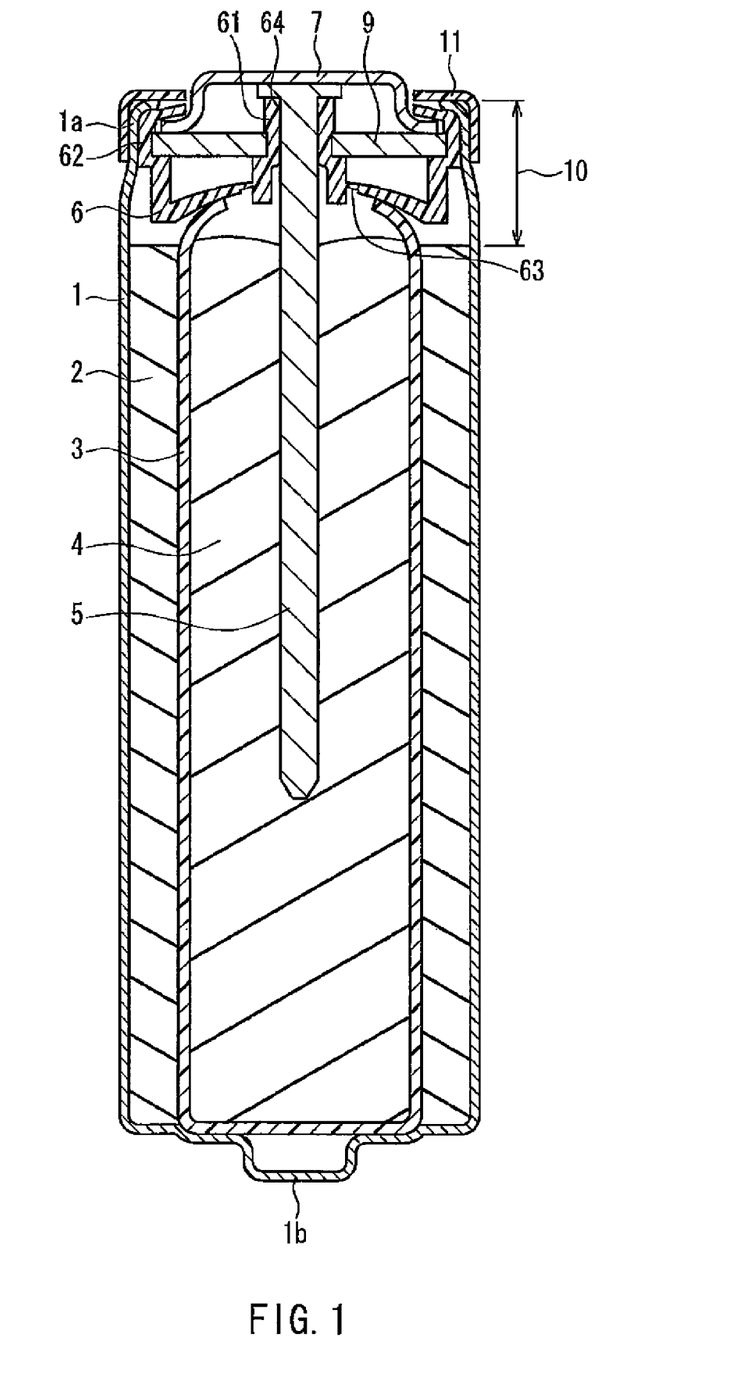
FIG. 1 is a cross-sectional view showing an example of an alkaline battery according to the present invention.

There is no particular limitation with respect to the shape or the like of the alkaline battery of the present invention, and examples of the shape include a tube (e.g., a cylinder or a square tube). In the following, a configuration of the alkaline battery according to the present invention shall be described with reference to the accompanying drawings. FIG. 1 is a cross-sectional view showing an example of the alkaline battery according to the present invention. The alkaline battery shown in FIG. 1 is configured such that a positive electrode 2 molded in a ring form (a molded product of a positive electrode mixture) is placed in an exterior can 1 made of metal (e.g., Ni-plated iron or stainless steel), a cup-shaped separator 3 is placed inside the positive electrode 2, and an alkaline electrolyte (not shown) has been injected from the inside of the separator 3. In addition, a negative electrode 4 containing zinc-based particles (a gel negative electrode mixture) is filled inside the separator 3. A reference numeral 1*b* at the exterior can 1 denotes a positive electrode terminal.

A negative electrode terminal plate 7 made of metal (e.g., Ni-plated iron or stainless steel) is disposed at an opening end 1*a* of the exterior can 1, and the opening end 1*a* is bent inward over an outer peripheral edge 62 of a resin sealing member 6, thereby sealing the exterior can 1. A negative electrode current collector rod 5 made of metal (e.g., brass plated with Sn or the like) is welded to the negative electrode terminal plate 7 at its top, and the negative electrode current collector rod 5 is inserted into the negative electrode 4 through a through-hole 64 formed in a central portion 61 of the sealing member 6. In addition, a metal washer 9 (a disc-shaped metal plate) is disposed as supporting means for preventing deformation of the negative electrode terminal plate 7 during sealing and supporting the sealing member 6 from inside.

Further, a thin-walled portion 63 for preventing explosion is formed at the sealing member 6. In the case where a gas is generated in the battery at the time of occurrence of short circuit of the battery, the thin-walled portion 63 of the sealing member 6 is preferentially ruptured, and the gas moves through the resulting opening to the metal washer 9 side. The metal washer 9 and the negative electrode terminal plate 7 are provided with a vent hole (not shown), and the gas inside the battery is discharged through these vent holes to the exterior of the battery. In FIG. 1, a numeral 10 denotes a sealing part, and a numeral 11 denotes a resin insulating cover.

Figure 2:
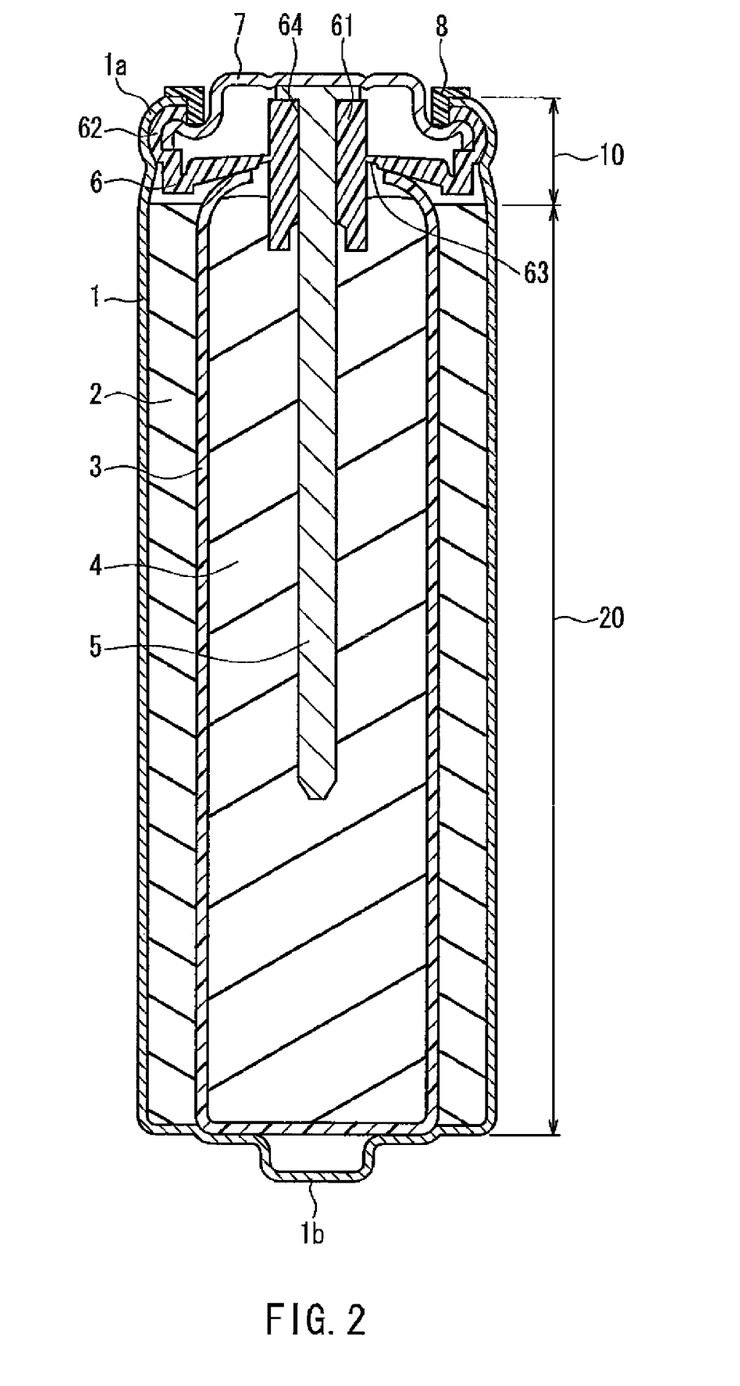
FIG. 2 is a cross-sectional view showing another example of an alkaline battery according to the present invention.

FIG. 2 shows a cross-sectional view showing another example of the alkaline battery according to the present invention. In FIG. 2, those elements having the same effects as those in FIG. 1 are denoted by the same reference numerals, and any overlapping description has been omitted. In FIG. 2, a numeral 8 denotes an insulating plate for providing insulation between the exterior can 1 and the negative electrode terminal plate 7, and a numeral 20 denotes a body part that houses the power generating element.

In the case of the alkaline battery shown in FIG. 1, the volume taken up by the sealing part 10 inevitably becomes large due to the use of the metal washer 9. In contrast, as in the alkaline battery shown in FIG. 2, by omitting the metal washer and using the negative electrode terminal plate 7 as the supporting means for supporting the sealing member 6 from inside, it is possible to reduce the volume taken up by the sealing part 10, thereby increasing the volume of the body part 20 that can house the power generating element. Accordingly, the filling amounts of the material mixtures of the positive electrode 2 and the negative electrode 4 can be increased, as compared with the battery shown in FIG. 1.

The alkaline battery according to the present invention exhibits excellent load characteristics and has a high capacity. Moreover, it has a battery voltage approximately equivalent to that of an alkaline battery using gamma-type manganese dioxide such as electrolytic manganese dioxide as a positive electrode active material, and also exhibits good storage characteristics. Accordingly, taking advantage of such characteristics, the alkaline battery of the present invention can be used for applications for which large current discharge is required (e.g., an application as the power source for digital cameras), and other applications similar to those of conventional alkaline batteries using manganese dioxide (gamma-type manganese dioxide) as a positive electrode active material.

Hereinafter, the present invention shall be described in detail by way of examples. However, the following examples are not intended to limit the present invention.

Synthesis of Spinel-Type Manganese Oxide

Synthesis Example 1

Electrolytic manganese dioxide (average particle diameter: 20 μm) and lithium hydroxide as a Li compound were dry-blended. Here, the mixing ratio of the electrolytic manganese dioxide and lithium hydroxide was set such that the ratio Li/Mn was 0.53. The above-described mixture was fired at 1000° C. for 20 hours, thereby synthesizing lithium-manganese spinel.

Powder of the synthesized lithium-manganese spinel was pulverized lightly using a mortar, and 50 g of the pulverized power was slowly introduced into 2000 ml of 2N sulfuric acid while being stirred. After stirring was continued for three hours from this state, the powder was collected by suction filtration, and the collected powder was washed until it became neutral by pouring the distilled water into the powder. Thus, powder resulting from extraction of Li from lithium-manganese spinel was obtained. After this powder was dried at 50° C. for 20 hours, the aggregate was broken and pulverized using a mortar, thereby obtaining spinel-type manganese oxide (1).

Synthesis Example 2

Spinel-type manganese oxide (2) was obtained in the same manner as in Synthesis Example 1, except that dry-blending was performed by further adding copper oxide (CuO) to the electrolytic manganese dioxide and lithium hydroxide at the time of synthesis of the lithium-manganese spinel. The mixing ratio of the electrolytic manganese dioxide, lithium hydroxide and copper oxide was set such that the ratio Li/(the sum of Mn and Cu) was 0.53, and that the amount of Cu was 5 mol %, based on a total of 100 mol % of Mn and Cu.

Synthesis Example 3

Spinel-type manganese oxide (3) was synthesized by heat-treating the spinel-type manganese oxide (1) with an electric furnace ("Type 1400 Furnaces" manufactured by Barnstead International) at 200° C. for 20 hours.

Synthesis Example 4

Spinel-type manganese oxide (4) was obtained in the same manner as in Synthesis Example 1, except that dry-blending was performed by further adding nickel hydroxide [(Ni(OH)$_2$)] to the electrolytic manganese dioxide and lithium hydroxide at the time of synthesis of the lithium-manganese spinel. The mixing ratio of the electrolytic manganese dioxide, lithium hydroxide and nickel hydroxide was set such that the ratio Li/(the sum of Mn and Ni) was 0.53, and that the amount of Ni was 5 mol %, based on a total of 100 mol % of Mn and Ni.

Synthesis Example 5

Spinel-type manganese oxide (5) was obtained in the same manner as in Synthesis Example 1, except that dry-blending was performed by further adding titanium dioxide (TiO$_2$) to the electrolytic manganese dioxide and lithium hydroxide at the time of synthesis of the lithium-manganese spinel. The mixing ratio of the electrolytic manganese dioxide, lithium hydroxide and titanium dioxide was set such that the ratio Li/(the sum of Mn and Ti) was 0.53, and that the amount of Ti was 5 mol %, based on a total of 100 mol % of Mn and Ti.

Example 1

The spinel-type manganese oxide (2) synthesized in Synthesis Example 2, graphite, PTFE powder and an alkaline electrolyte (a 56 mass % potassium hydroxide aqueous solution containing 2.9 mass % of zinc oxide) used for preparing a positive electrode mixture were mixed to prepare a positive electrode mixture. In this positive electrode mixture, 7.6 parts by mass of graphite, 1.0 part by mass of the PTFE powder and 4.5 parts by mass of the alkaline electrolyte were contained, per 100 parts by mass of the spinel-type manganese oxide (2).

Then, zinc alloy particles containing In, Bi and Al in amounts of 0.05 mass %, 0.05 mass % and 0.005 mass %, respectively, sodium polyacrylate, polyacrylic acid and an alkaline electrolyte (a 33.5 mass % potassium hydroxide aqueous solution containing 2.2 mass % of zinc oxide) used for preparing a negative electrode mixture were mixed at a mass ratio of 39:0.2:0.2:18 to prepare a gel negative electrode mixture. The above-described zinc alloy particles have an average particle diameter of 109 µm. All of the zinc alloy particles passed through a sieve of 80 mesh, and 20 mass % of the total amount of the zinc alloy particles passed through a sieve of 200 mesh, and they have a bulk density of 2.63 g/cm$^3$.

Additionally, an exterior can 1 for an AA alkaline battery, made of killed steel having a matte nickel-plated surface and having the shape shown in FIG. 2, was provided as an exterior can. The exterior can 1 had been processed such that the thickness of a sealing part 10 was 0.25 mm and the thickness of a body part 20 was 0.16 mm, and that the thickness of the positive electrode terminal portion was slightly larger than the thickness of the body part 20 in order to prevent a positive electrode terminal 1b from being dented when the battery was dropped. Using the exterior can 1, an alkaline battery was produced as follows.

About 11 g of the above-described positive electrode mixture was inserted into the exterior can 1, and pressure-molded into the form of a ring (hollow cylinder) such that three molded products of the positive electrode mixture having an inner diameter of 9.1 mm, an outer diameter of 13.7 mm and a height of 13.9 mm were stacked upon one another. Then, a groove was formed in a position located 3.5 mm below from the opening end of the exterior can 1 in the height direction, and pitch was applied onto the inner side of the exterior can 1 to this groove position in order to improve the adhesion between the exterior can 1 and a sealing member 6.

Then, three layers of nonwoven fabric made of acetalized vinylon and purified cellulose fiber and having a thickness of 100 µm and a weight per unit area of 30 g/m$^2$ were rolled up into a tube form. Apart forming the bottom of this structure was bent, and that portion was heat-sealed, thereby forming a cup-shaped separator 3, one end of which was closed. As the purified cellulose fiber, "TENCEL (trademark)" manufactured by Courtaulds was used. The separator 3 was placed inside the positive electrode 2, which was inserted in the exterior can 1, and 1.35 g of an alkaline electrolyte (a 33.5 mass % potassium hydroxide aqueous solution containing 2.2 mass % of zinc oxide) for injection was injected into the separator, and 5.74 g of the above-described negative electrode mixture was further filled into the separator 3, thereby forming a negative electrode 4. At this time, the total amount of moisture in the battery system was 0.261 g per gram of the positive electrode active material.

After filling the above-described power generating element, a negative electrode current collector rod 5 made of brass having a tin-plated surface, combined with the sealing member 6 made of Nylon 66, was inserted into the central part of the negative electrode 4, and the negative electrode current collector rod 5 was clamped from the outside of the opening end 1a of the exterior can 1 by a spinning process, thereby producing an AA-size alkaline battery as shown in FIG. 2. Here, the negative electrode current collector rod 5 used was attached in advance by welding to a negative electrode terminal plate 7, which is formed by a punching and pressing process, and is made of a nickel-plated steel plate having a thickness of 0.4 mm. In addition, an insulating plate 8 was placed between the opening end of the exterior can 1 and the negative electrode terminal plate 7 for preventing short circuit. In the above-described manner, a cylindrical alkaline battery of Example 1 was produced.

Example 2

A cylindrical alkaline battery was produced in the same manner as in Example 1, except that the spinel-type manganese oxide (3) synthesized in Synthesis Example 3 was used in place of the spinel-type manganese oxide (2).

Comparative Example 1

A cylindrical alkaline battery was produced in the same manner as in Example 1, except that the spinel-type manganese oxide (1) synthesized in Synthesis Example 1 was used in place of the spinel-type manganese oxide (2).

Comparative Example 2

A cylindrical alkaline battery was produced in the same manner as in Example 1, except that the spinel-type manganese oxide (4) synthesized in Synthesis Example 4 was used in place of the spinel-type manganese oxide (2).

Comparative Example 3

A cylindrical alkaline battery was produced in the same manner as in Example 1, except that the spinel-type manganese oxide (5) synthesized in Synthesis Example 5 was used in place of the spinel-type manganese oxide (2).

The configurations of the spinel-type manganese oxides used for the batteries of Examples 1, 2 and Comparative Examples 1 to 3, the potentials of the spinel-type manganese oxides with respect to a Hg/HgO reference electrode that were measured by the following method, and the structures (the S values obtained by the Rietveld method) of the spinel-type manganese oxides that were verified by the following method are shown in Table 1.

Measurement of Potential of Spinel-Type Manganese Oxides with Respect to Hg/HgO Reference Electrode 100 parts by mass of each of the spinel-type manganese oxides, 10 parts by mass of a 2 mass % CMC solution, 20 parts by mass of water and 1 part by mass of a 60 mass % PTFE dispersion were mixed to prepare a paste. After this paste was filled into three-dimensional nickel foam, nickel wire was spot-welded to the foam. The three-dimensional nickel foam was immersed in a 32 mass % KOH aqueous solution (an alkaline electrolyte) containing 2.18 mass % of ZnO, and the potential of the spinel-type manganese oxide in the three-dimensional nickel foam was measured at room temperature, using Hg/HgO as a reference electrode.

Verification of Structure of Spinel-Type Manganese Oxides

Figure 3:
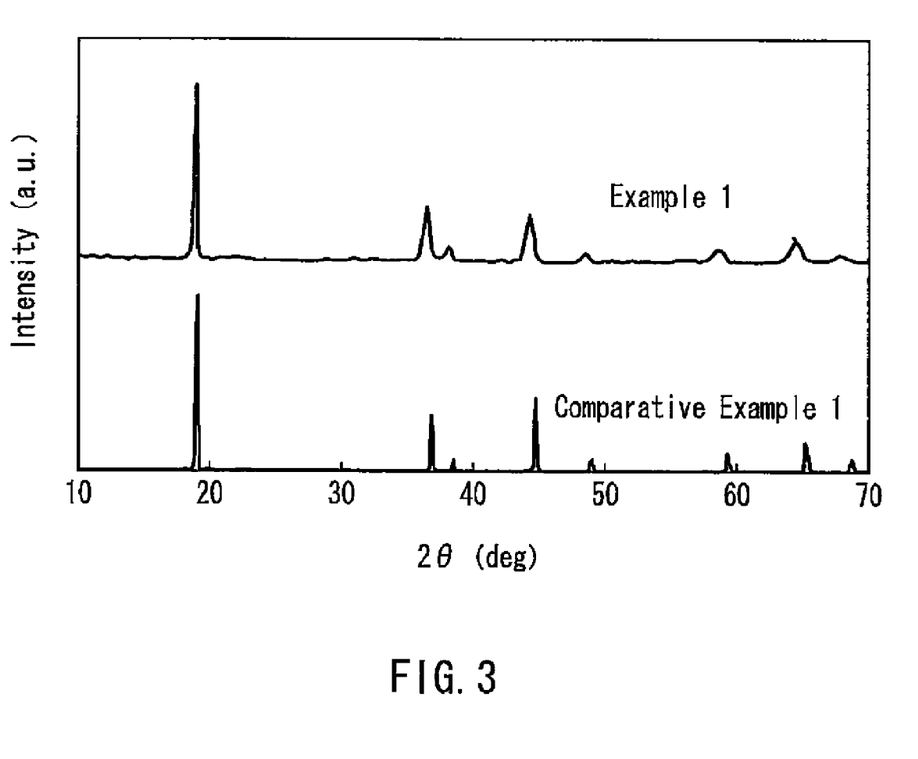
FIG. 3 is an X-ray diffraction diagram for a spinel-type manganese oxide (2) used for an alkaline battery of Example 1, and a spinel-type manganese oxide (1) used for an alkaline battery of Comparative Example 1.

By crystal structure analysis using the Rietveld method, the structure of each of the spinel-type manganese oxides was verified in the following manner. Using CuKα radiation as a radiation source in X-ray diffraction, the analysis was performed, assuming that the crystal structure of each of the spinel-type manganese oxides belonged to the space group Fd3m (No. 227), which is a spinel-type crystal structure, and the S value, which is an index of the analytical error, was confirmed. Here, if a spinel-type manganese oxide has an S value of less than 2, then that spinel-type manganese oxide can be considered as a spinel-type crystal structure of the present invention. FIG. 3 shows the X-ray diffraction diagram of the spinel-type manganese oxide (2) used for the battery of Example 1 and the spinel-type manganese oxide (1) used for the battery of Comparative Example 1.

TABLE 1

Spinel-type manganese oxide

| | No. | Substituent element | Heat-treatment | Potential with respect to Hg/HgO reference electrode (v) | S value of Rietveld analysis |
|---|---|---|---|---|---|
| Ex. 1 | (2) | Cu | not performed | 0.289 | 1.89 |
| Ex. 2 | (3) | — | performed | 0.319 | 1.90 |
| Com. Ex. 1 | (1) | — | not performed | 0.376 | 1.80 |
| Com. Ex. 2 | (4) | Ni | not performed | 0.368 | 1.81 |
| Com. Ex. 3 | (5) | Ti | not performed | 0.426 | 1.94 |

In addition, the cylindrical alkaline batteries of Examples 1, 2 and Comparative Examples 1 to 3 were evaluated for the following points. The results are shown in Table 2.

Measurement of Discharge Capacity

Each of the alkaline batteries of Examples 1, 2 and Comparative Examples 1 to 3 was continuously discharged at 20° C. with a current of 50 mA, and the discharge capacity until an end voltage of 0.9 V was reached was measured. In the results shown in Table 2, the discharge capacity of each of the batteries is shown as a relative value, taking the discharge capacity of the alkaline battery of Comparative Example 1 as 100.

Measurement of Open-Circuit Voltage

For each of the alkaline batteries of Examples 1, 2 and Comparative Examples 1 to 3, the open-circuit voltage (OCV) after production of the battery was measured.

Measurement of Capacity Retention Rate

For each of the alkaline batteries of Examples 1, 2 and Comparative Examples 1 to 3, the discharge characteristics deterioration caused by storage was determined as the capacity retention rate after storage.

Here, the capacity retention rate was determined in the following manner. Each of the alkaline batteries of Examples 1, 2 and Comparative Examples 1 to 3 before storage was continuously discharged at 20° C. with a current of 50 mA, and the discharge capacity (discharge period) until an end voltage of 0.9 V was reached was measured. After another sample of each of the alkaline batteries of Examples 1, 2 and Comparative Examples 1 to 3 was stored at 80° C. for 48 hours, the battery was continuously discharged at 20° C. with a current of 50 mA, and the discharge capacity (discharge period) until an end voltage of 0.9 V was reached was measured. The capacity retention rate was evaluated based on "ratio of discharge period after storage to discharge period before storage" obtained from each of the above-described discharge periods using the following equation. It should be noted that the storage at 80° C. for 48 hours is assumed to correspond to storage at 20° C. for two years.

Capacity retention rate (%)=100×(Discharge period after storage)/(Discharge period before storage)

TABLE 2

| | Discharge capacity | Circuit voltage (V) | Capacity retention rate (%) |
|---|---|---|---|
| Example 1 | 214 | 1.68 | 78 |
| Example 2 | 304 | 1.65 | 84 |
| Com. Ex. 1 | 100 | 1.74 | 63 |
| Com. Ex. 2 | 164 | 1.73 | 65 |
| Com. Ex. 3 | 198 | 1.79 | 59 |

As can be seen from Table 2, the batteries of Examples 1 and 2 had a larger discharge capacity than the batteries of Comparative Examples 1 to 3. Since the discharge capacity was measured at a comparatively large discharge current of 50 mA, it can be also seen that the batteries of Examples 1 and 2 had favorable load characteristics. Further, the batteries of Examples 1 and 2 had an open-circuit voltage of not more than 1.7 V, which is approximately equivalent to that of conventional alkaline batteries using ordinary manganese dioxide. Moreover, it can be also seen that the batteries of Examples 1 and 2 had a higher capacity retention rate than the batteries of Comparative Examples 1 to 3, and therefore exhibited excellent storage characteristics.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A positive electrode for an alkaline battery comprising a spinel-type manganese oxide as a positive electrode active material,
    wherein the spinel-type manganese oxide has a potential of 0.26 to 0.34 V with respect to a Hg/HgO reference electrode, and
    the content of the spinel-type manganese oxide in the entire positive electrode active material is not less than 60 mass %.

2. The positive electrode for an alkaline battery according to claim 1, further comprising
    electrolytic manganese dioxide as a positive electrode active material.

3. The positive electrode for an alkaline battery according to claim 1, further comprising
    electrolytic manganese dioxide as a positive electrode active material,
    wherein the content of the electrolytic manganese dioxide in the entire positive electrode active material is not more than 70 mass %.

4. The positive electrode for an alkaline battery according to claim 1,
    wherein the spinel-type manganese oxide has a potential of not less than 0.27 V with respect to a Hg/HgO reference electrode.

5. The positive electrode for an alkaline battery according to claim 1,
    wherein the spinel-type manganese oxide has a potential of not less than 0.28 V with respect to a Hg/HgO reference electrode.

6. The positive electrode for an alkaline battery according to claim 1,
    wherein the spinel-type manganese oxide has a potential of not more than 0.32 V with respect to a Hg/HgO reference electrode.

7. The positive electrode for an alkaline battery according to claim 1,
wherein the spinel-type manganese oxide further comprises Cu.

8. The positive electrode for an alkaline battery according to claim 1,
wherein the spinel-type manganese oxide is obtained by heat-treating, at 180 to 220° C. for 15 to 25 hours, a spinel-type manganese oxide having a potential of more than 0.34 V with respect to a Hg/HgO reference electrode.

9. An alkaline battery comprising: a positive electrode; a negative electrode; and an electrolyte,
wherein the positive electrode comprises a spinel-type manganese oxide having a potential of 0.26 to 0.34 V with respect to a Hg/HgO reference electrode as a positive electrode active material, and
the content of the spinel-type manganese oxide in the entire positive electrode active material of the positive electrode is not less than 60 mass %.

10. The alkaline battery according to claim 9,
wherein the positive electrode further comprises electrolytic manganese dioxide as a positive electrode active material.

11. The alkaline battery according to claim 9,
wherein the positive electrode further comprises electrolytic manganese dioxide as a positive electrode active material, and
the content of the electrolytic manganese dioxide in the entire positive electrode active material is not more than 70 mass %.

12. The alkaline battery according to claim 9,
wherein the spinel-type manganese oxide has a potential of not less than 0.27 V with respect to a Hg/HgO reference electrode.

13. The alkaline battery according to claim 9,
wherein the spinel-type manganese oxide has a potential of not less than 0.28 V with respect to a Hg/HgO reference electrode.

14. The alkaline battery according to claim 9,
wherein the spinel-type manganese oxide has a potential of not more than 0.32 V with respect to a Hg/HgO reference electrode.

15. The alkaline battery according to claim 9,
wherein the spinel-type manganese oxide further comprises Cu.

16. The alkaline battery according to claim 9,
wherein the spinel-type manganese oxide is obtained by heat-treating, at 180 to 220° C. for 15 to 25 hours, a spinel-type manganese oxide having a potential of more than 0.34 V with respect to a Hg/HgO reference electrode.

17. The alkaline battery according to claim 9,
wherein the negative electrode comprise zinc or a zinc alloy as a negative electrode active material.

18. The alkaline battery according to claim 9,
wherein the electrolyte comprises an aqueous solution containing a hydroxide of alkali metal.

* * * * *